United States Patent
Asano et al.

(10) Patent No.: US 7,356,713 B2
(45) Date of Patent: Apr. 8, 2008

(54) METHOD AND APPARATUS FOR MANAGING THE POWER CONSUMPTION OF A DATA PROCESSING SYSTEM

(75) Inventors: Shigehiro Asano, Austin, TX (US); Jeffrey Douglas Brown, Rochester, MN (US); Michael Norman Day, Round Rock, TX (US); Charles Ray Johns, Austin, TX (US); James Allan Kahle, Austin, TX (US); Alvan Wing Ng, Austin, TX (US); Michael Fan Wang, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 10/631,537

(22) Filed: Jul. 31, 2003

(65) Prior Publication Data

US 2005/0028015 A1    Feb. 3, 2005

(51) Int. Cl.
*G06F 1/00* (2006.01)
*G06F 1/26* (2006.01)
*G06F 1/32* (2006.01)

(52) U.S. Cl. .................. 713/300; 713/320; 713/323

(58) Field of Classification Search .............. 713/300, 713/320, 323
See application file for complete search history.

(56) References Cited

U.S. PATENT DOCUMENTS

| 5,666,537 | A  | * | 9/1997  | Debnath et al.   | 713/322 |
| 5,669,003 | A  |   | 9/1997  | Carmean et al.   |         |
| 5,809,314 | A  |   | 9/1998  | Carmean et al.   |         |
| 6,014,751 | A  | * | 1/2000  | Kardach et al.   | 713/324 |
| 6,826,656 | B2 | * | 11/2004 | Augsburg et al.  | 711/144 |
| 2003/0126377 | A1 | * | 7/2003 | Orenstien et al. | 711/146 |
| 2005/0044448 | A1 | * | 2/2005 | Verdun           | 714/22  |

* cited by examiner

*Primary Examiner*—A. Elamin
*Assistant Examiner*—Michael J Brown
(74) *Attorney, Agent, or Firm*—Carr LLP; D'Ann N. Rifai

(57) ABSTRACT

A component of a microprocessor-based data processing system, which includes features for regulating power consumption in snoopable components and has gating off memory coherency properties, is determined to be in a relatively inactive state and is transitioned to a non-snoopable low power mode. Then, when a snoop request occurs, a retry protocol is sent in response to the snoop request. In conjunction with the retry protocol, a signal is sent to bring the component into snoopable mode. When the retry snoop is requested, the component is in full power mode and can properly respond to the snoop request. After the snoop request has been satisfied, the component again enters into a low power mode. Therefore, the component is able to enter into a low power mode in between snoops.

18 Claims, 5 Drawing Sheets

METHOD AND APPARATUS FOR MANAGING THE POWER CONSUMPTION OF A DATA PROCESSING SYSTEM

BACKGROUND OF THE INVENTION

1. Field of the Invention

The present invention relates generally to the field of microprocessor-based data processing systems and, more particularly, to regulating power consumption in snoopable components.

2. Description of the Related Art

Advances in semiconductor processing technology have made it possible to compact the feature sizes of integrated circuits to allow more transistors to be fabricated on a single semiconductor substrate. For example, the most sophisticated microprocessors being manufactured today typically comprise a single integrated circuit made up of several million transistors. Although these astounding technological advances have made it possible to dramatically increase the performance and data handling capabilities of modern data processing systems, these advances have come at the cost of increased power consumption. Increased power consumption, of course, means that there is more heat that must be dissipated from the integrated circuits.

Because excessive power consumption and heat dissipation are now a critical problem facing computer designers, various power-saving techniques have evolved for minimizing power supply and current levels within computer systems. Many of these techniques adopt the strategy of powering down the microprocessor when not in use to conserve power. This approach, however, is not without drawbacks.

Some power management modes targeting snoopable components require components to flush their snoopable contents before entering a non-snoopable low power mode. Depending on the cache size, flushing all cache contents could take tens of thousands of cycles, and often can limit the application of power management modes. Also, some components are prevented from entering into a low power mode, because the component still needs to respond to snoops. However, power is wasted if the time between snoops is relatively long.

Therefore, a method and apparatus is needed for an opportunistic system able to enter into a low power mode during periods between snoops.

SUMMARY OF THE INVENTION

The present invention provides a method and an apparatus for managing power consumption of an allocated component of a microprocessor-based data processing system. When the allocated component is determined to be in a relatively inactive state, it is transitioned to a non-snoopable low power mode. If a snoop request occurs, a retry protocol is sent in response. Also, a signal is sent to bring the component back into a snoopable mode. When the snoop is subsequently requested, the component properly responds to the snoop request. After responding to the snoop request, the component enters a low power mode. Entering a low power mode between snoops allows the component to be opportunistic, by entering a low power mode more often than otherwise possible.

BRIEF DESCRIPTION OF THE DRAWINGS

The present invention will be understood more fully from the detailed description that follows and with reference to the accompanying drawings. The drawings do not limit the invention to the specific embodiments shown.

DETAILED DESCRIPTION

The present invention is a method of operating a data processing system to maintain memory coherency while minimizing power consumption. In the following description, numerous specific details are set forth, such as particular signals, protocol, device types, etc., to provide a thorough understanding of the present invention. It should be understood, however, that these specific details need not be used to practice the present invention. In other instances, well known structures, circuit blocks and architectures have not been shown in detail to avoid obscuring the present invention. The present invention may utilize any type of microprocessor architecture. Although the present invention will be described in conjunction with the embodiment of FIG. 1, it should be understood that the broad concept of the present invention is applicable to many different types of data processing systems and has little chip or system level constraints. The broad concept of the present invention is applicable to components that are able to enter non-snoopable modes.

Figure 1:
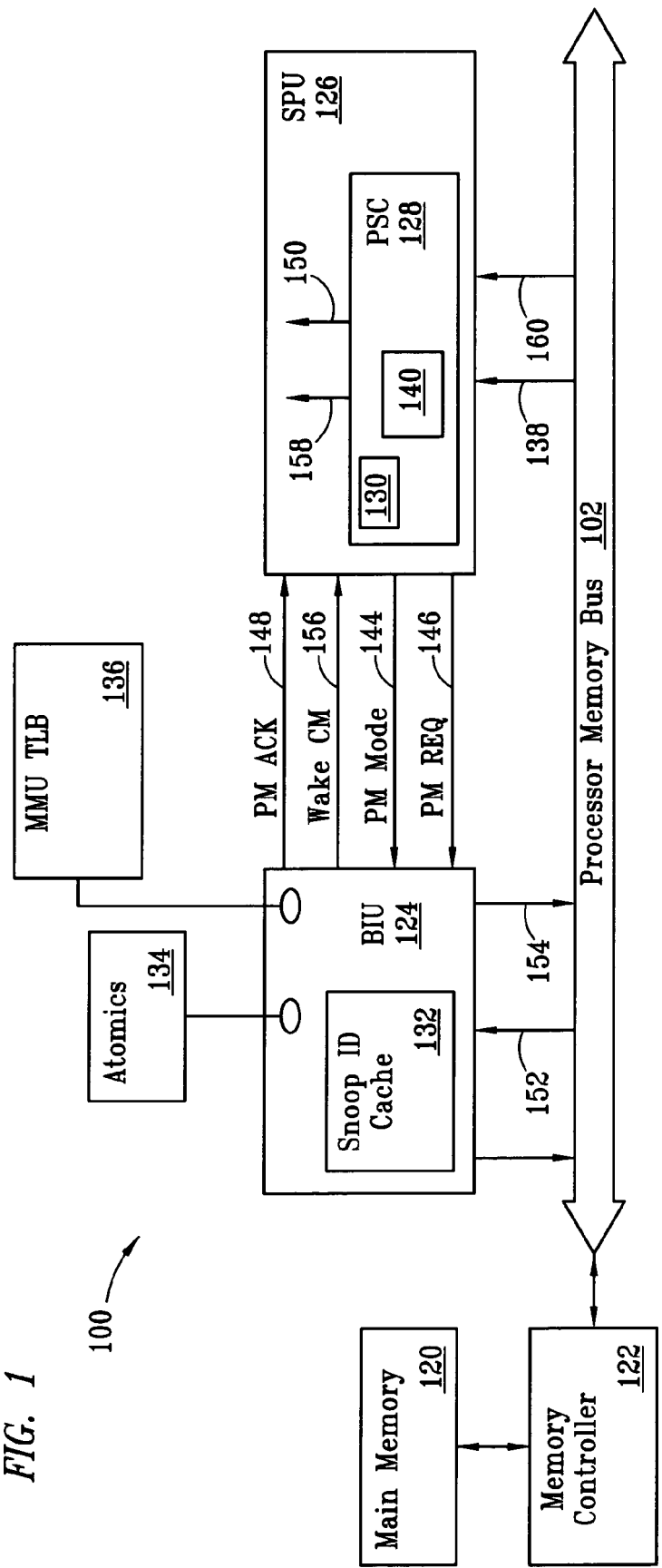
FIG. 1 is a generalized block diagram of a section of a microprocessor.

FIG. 1 is a block diagram that illustrates a data processing system (DPS) 100 such as may be used with one embodiment of the present invention. The DPS 100 generally comprises a main memory 120, memory controller 122, a processor-memory bus or other communication means 102 for communicating information between different agents coupled to the bus 102, such as processors, bus bridges, memory devices, peripheral devices, etc. The processor-memory bus 102 includes arbitration, address, data and control buses, and a bus interface unit (BIU) 124. If multiple processors are used, each may be a parallel processor (a symmetric co-processor) or an asymmetric co-processor, such as a digital signal processor. In addition, the processors may include processors of different types.

A slave processing unit (SPU) 126 contains a power state control (PSC) 128. The PSC 128 has gating off memory coherency properties and memory coherency may be disabled for the component. Inside the PSC 128 is a counter 130 for counting cycles. The PSC 128 is coupled to and can communicate with the BIU 124. The BIU 124 preferably contains a snoop ID cache 132.

Figure 2A:
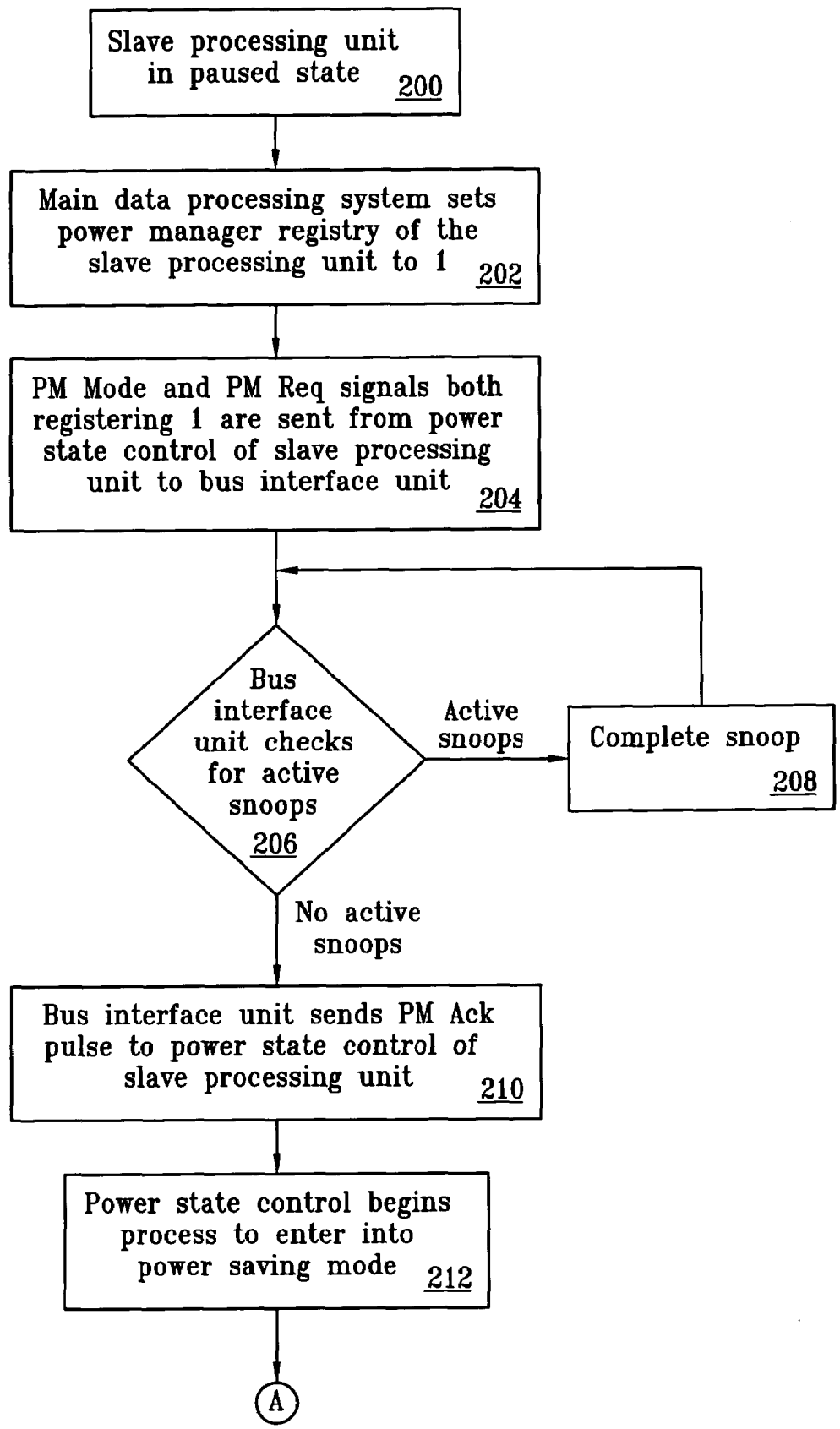
FIGS. 2A-2B are portions of a flow diagram of an operation transferring the component between a low power non-snoopable mode and a low power snoopable mode.
Figure 2B:
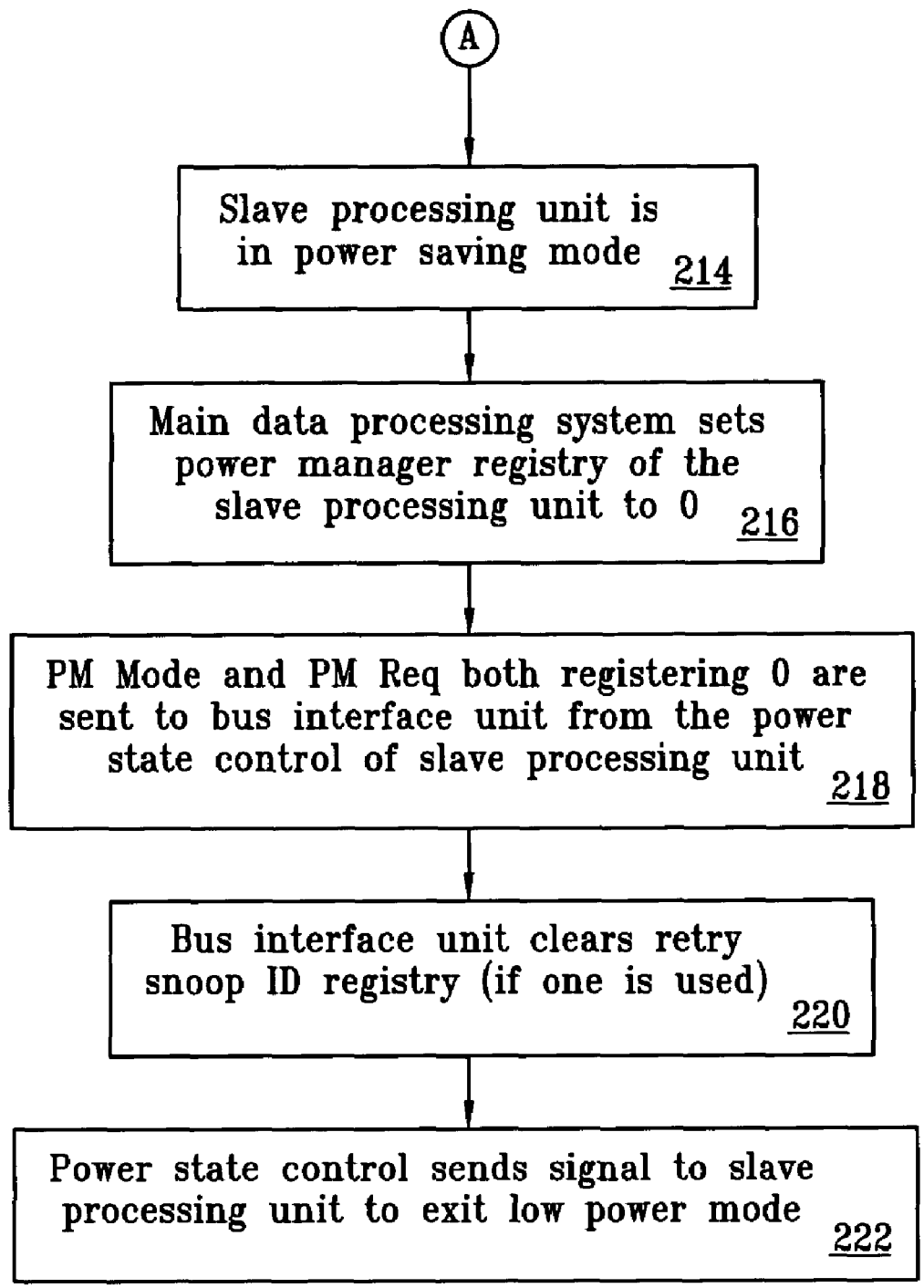

FIGS. 2A and 2B show one process whereby the SPU 126 may enter into a power saving mode. In step 200, the SPU 126 is in a paused or suspended state. In step 202, the DPS 100 signals the SPU 126 to set a power manager registry (PM) 140 to 1 (see FIG. 1, signal 138). As shown in step 204, once the PSC 128 receives the signal 138 and sets the PM 140 to 1, the PSC 128 sends a PM Mode signal 144 and a PM Req signal 146 to the BIU 124. At this stage, the PM Mode 144 and the PM Req 146 are both static signals and set to 1 and the PSC 128 is in a state to enter a low power mode.

Before the PSC 128 enters the non-snoopable low power mode, the BIU 124 checks to see if any snoop requests are active or pending. In step 206, the BIU 124 receives the PM Mode 144 and the PM Req 146 and determines if there are any active or pending snoop requests requiring the SPU 126. If there are any snoop requests requiring the SPU 126, the BIU 124 completes those snoop requests, in step 208, before sending a signal to the SPU 126 to enter the non-snoopable low power mode. If no snoop requests are active or pending that require the SPU 126, then the BIU 124 sends a one cycle pulse, PM Ack 148, to the PSC 128 to initiate the process of entering the non-snoopable low power mode, in step 210. After receiving the PM Ack 148, the PSC 128 sends a signal 150 to turn off the clock mesh, in step 212, and the PSC 128 enters into a low power mode, in step 214. Any signal that results in starting a power saving mode may be utilized as signal 150, such as for example shutting down the voltage source, clock mesh, or otherwise reducing power consumption. After sending the PM Ack 148, the BIU 124 registers that the PSC 128 has entered a low power mode and cannot honor any snoop requests, as shown in step 310 of FIG. 3A.

Because the PSC 128 has entered a low power non-snoopable mode, the PSC 128 would have to exit the low power mode before it can honor any snoop requests. If the BIU 124 receives a snoop request 152, in step 324, that requires the SPU 126, as in step 326, the BIU 124 responds to the snoop request 152 with a snoop retry protocol 154, as shown in step 338. After the BIU 124 sends the snoop retry 154, the BIU 124 sends a one cycle wake-up pulse, Wake CM 156, to the PSC 128 to turn on the clock mesh and exit the low power mode, in step 340.

After the PSC 128 has received the Wake CM 156 signal from the BIU 124, the PSC 128 begins to exit the low power mode it is currently in, in step 342. To exit the low power mode, the PSC 128 sends a signal 158 to turn on the clock mesh, or some other similar signal, to exit the low power mode, in step 344. After the PSC 128 sends the signal 158 to turn on the clock mesh, the PSC 128 changes the PM Req 146 to 0 and sends the PM Req 146, now set to 0, to the BIU 124, in step 346. The BIU 124 sees the PM Req 146 is set to 0 and in response registers that the SPU 126 has entered a snoopable power mode and the SPU 126 can now honor any snoop requests. The BIU 124 will send any further snoop requests to the SPU 126, as shown in step 208.

To be both opportunistic and able to enter into a low power mode during periods between snoops, the SPU 126 needs to have a method for knowing when it can re-enter the low power mode. To accomplish this, the PSC 128 uses a counter 130 to count a predetermined number of cycles after the PSC 128 has set the PM Req 146 to 0, in step 348. The predetermined number of cycles may preferably be 128 cycles, but can be any number that will typically be enough cycles to respond to a snoop request including only one cycle. After the predetermined number of cycles, the PSC 128 will set the PM Req 146 to 1, meaning the PSC 128 is in a state to enter a low power mode, in step 350, and will send the PM Req 146 and the PM Mode 144 to the BIU 124, in step 204. At this point, steps 206-214 are repeated and if no snoops are active or pending, the BIU 124 sends the PM Ack 148 signal to the PSC 128 and the SPU 126 enters a low power mode. This allows the SPU 126 to be opportunistic and enter into a low power mode during periods between snoops.

Depending on the snoop retry protocol and system configuration, the time taken for a snoop to retry may exceed the time the SPU 126 stays in a snoopable mode before re-entering the low power non-snoopable mode. A live-lock situation may occur if the SPU 126 re-enters the low power mode too early. A live-lock situation is produced when a retried snoop request reaches the BIU 124 after the SPU 126 has entered the low power mode and therefore the snoop request 152 is sent back for a retry every time.

Figure 3A:
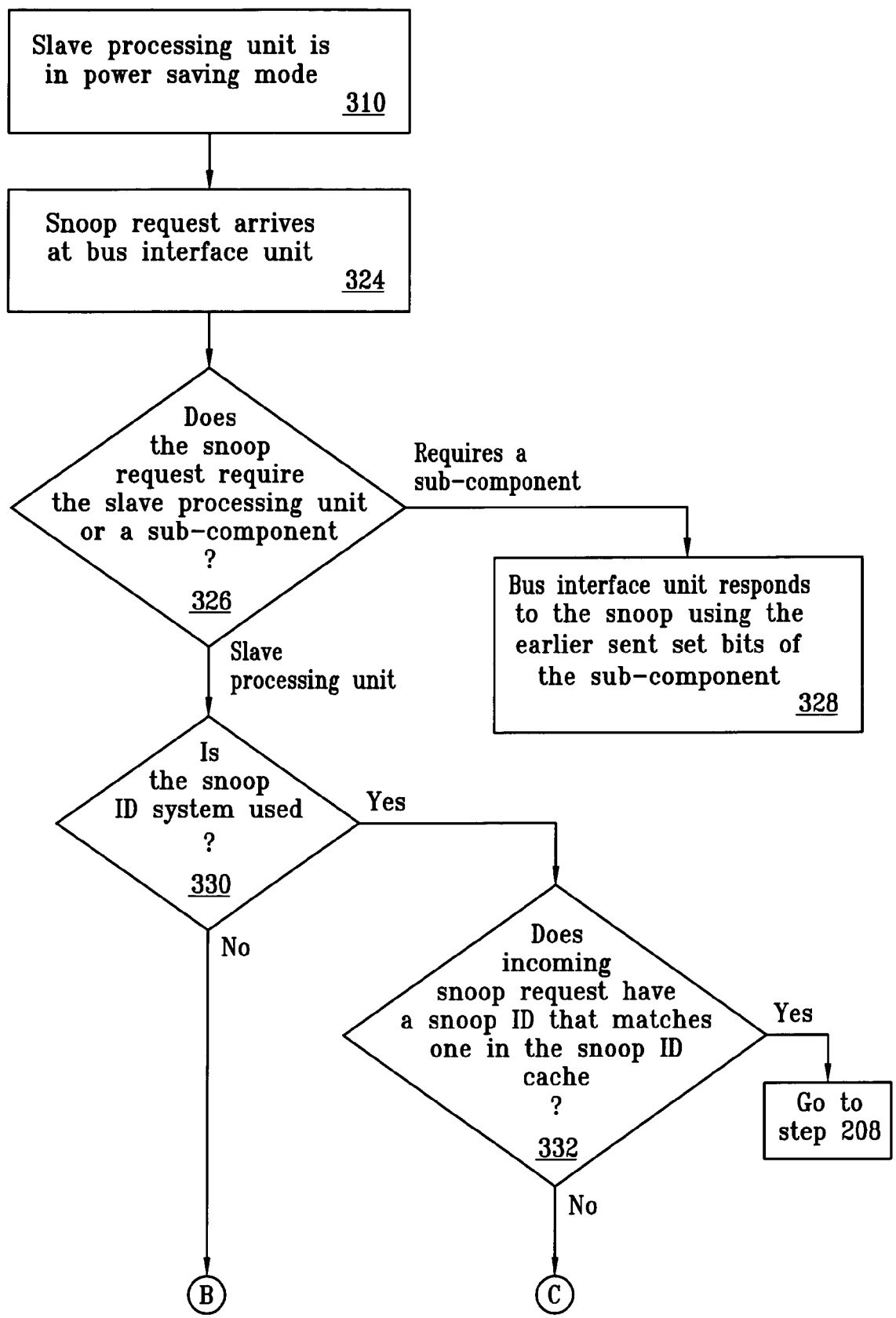
FIGS. 3A-3B are portions of a flow diagram of an operation whereby a snoop request arrives and the component is transferred between a low power non-snoopable mode and a low power snoopable mode.
Figure 3B:
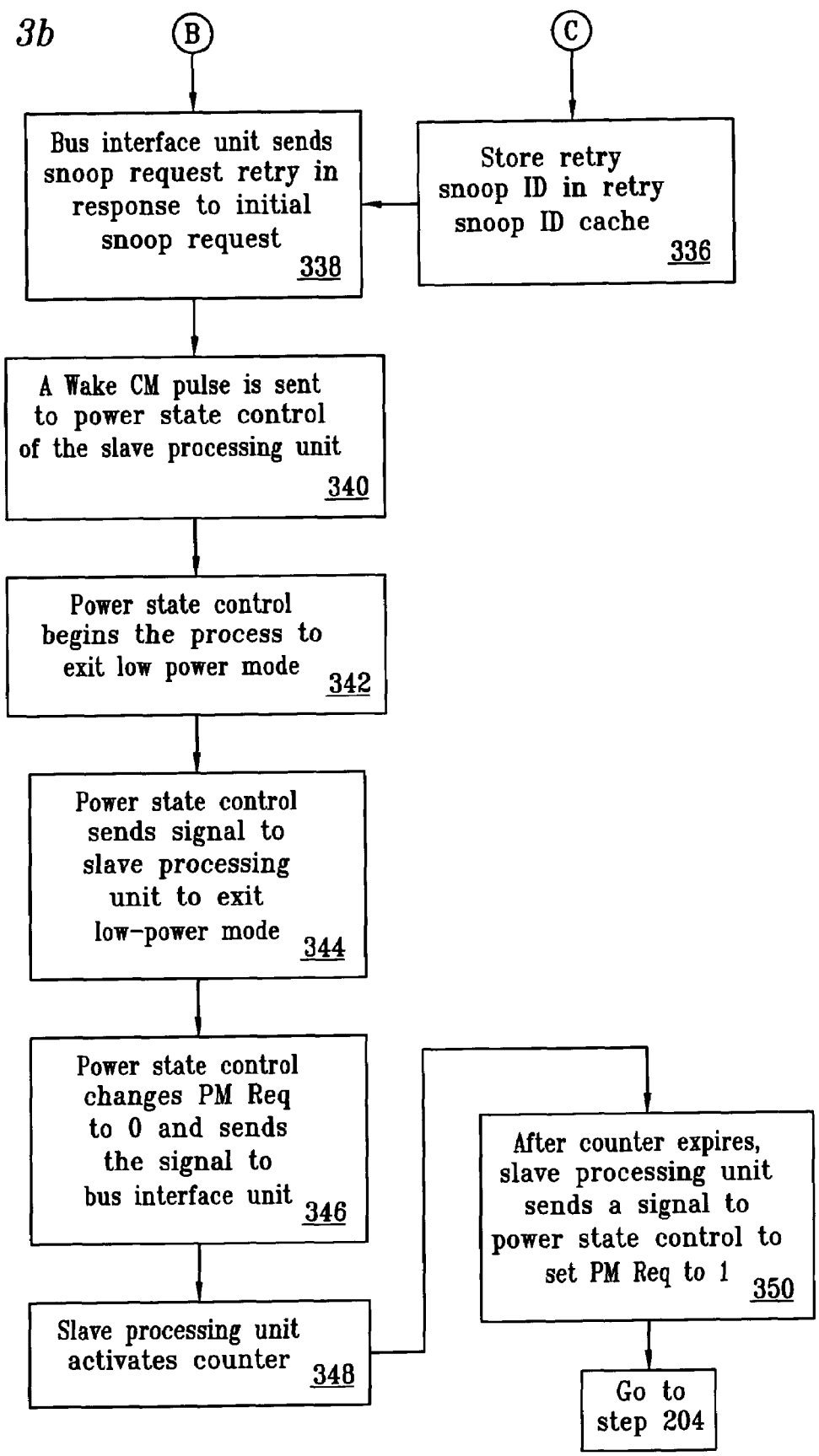

To prevent a live-lock situation, a snoop ID may be used. For example, FIG. 3A shows a snoop request sent to the BIU 124, similar to step 324. Once the snoop request is received, in step 324, that requires the SPU 126, as in step 326, and a snoop ID system is used, as in step 330, the snoop ID is compared to the snoop IDs in the snoop ID cache 132, in step 332. If the snoop ID matches one of the snoop IDs stored in the snoop ID cache 132, then the snoop is completed, as in step 208. If the snoop ID is not in the snoop ID cache 132, instead of just sending a retry protocol, the BIU 124 stores the snoop ID in the snoop ID cache 132, in step 336. Now the BIU 124 knows there is a pending retry snoop and will not send the one cycle pulse, PM Ack 148, to the PSC 128 to initiate the process of entering the non-snoopable low power mode. The snoop ID may be stored for only the first snoop request, or it may be stored for every snoop request. Once the snoop ID has been stored, the BIU 124 sends the Wake CM 156, as in step 340.

If a snoop ID is used, when the BIU 124 receives a snoop request, it compares the incoming snoop request ID to the stored snoop IDs. If the ID matches a stored snoop ID, the snoop ID cache 132 may be cleared. The snoop ID cache 132 may be cleared of just the matching snoop ID, or it may be completely flushed.

By using a snoop ID, a live lock situation is prevented because as each snoop request arrives, the snoop ID for that request is stored for comparison with later snoops. This enables the BIU 124 to know if any snoops have not been resent and, therefore, the BIU 124 can keep the SPU 126 in a snoopable power mode until all the retried snoops have been resent. Consequently, a retried snoop request can always reach the BIU 124 before the SPU 126 has entered the low power mode.

To prevent the situation where if the first snoop, or any subsequent snoop, is sent back for retry but is never resent, each stored snoop ID may be cleared after a preset number of cycles have passed. The preset number of cycles should be long enough so that a snoop sent for retry will have time to be resent. The number of cycles depends on the system, components in the system, software, etc.

To bring the SPU 126 to a snoopable power mode and prevent the SPU 126 from entering into a non-snoopable mode, the DPS 100 signals the SPU 126 to set the PM 140 to 0 (see FIG. 1, signal 160), in step 216. Once the PSC 128 receives signal 160, the PSC 128 sets the PM 140 to 0 and sends a signal 158 to turn on the clock mesh and exit the low power mode, in step 222. PSC 128 will ignore any future PM Ack pulses 148 and the PSC 128 can process any future snoop requests.

To communicate to the BIU 124 that the SPU 126 will no longer be able to enter the low power mode, the PSC 128 changes the PM Mode 144 and the PM Req 146 from 1 to 0. Then, as shown in step 218, the PM Mode 144 and the PM Req 146 are sent to the BIU 124. In response to receiving the PM Mode 144 and the PM Req 146 set to 0, the BIU 124 clears the snoop ID cache 132, in step 220.

In addition to being opportunistic and able to enter into a low power mode during periods between snoops, the invention may be able to give a valid response to snoop requests targeting groups of snoopable contents without having to wake up the entire component. For example, the BIU 124 may be in communication with many sub-components, such as atomics 134, an L1 local cache, or a memory management unit translation lookaside buffer (MMU TLB) with memory coherency properties. A snoop request requiring information in one of the sub-components, like the MMU TLB 136, could be satisfied without having the MMU TLB 136 or the SPU 126 exit the low power mode, in step 326. To achieve this, the MMU TLB 136 would send set bits to the BIU 124. The BIU 124 would store the bits and when a snoop request is sent targeting the MMU TLB 136, the BIU 124 would use the stored bits and respond to the snoop request with a valid response without having to wake the SPU 126, in step 328. Thereby giving a valid response to a snoop request targeting the MMU TLB 136 contents without having to wake up the SPU 126 or the MMU TLB 136.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

The invention claimed is:

1. A method for entering into a low power non-snoopable mode between snoop requests, comprising the steps of:
   allocating a component of a data processing system;
   transitioning said allocated component to an inactive state;
   transitioning said component to a non-snoopable low power mode;
   receiving a snoop request from a sender, wherein the snoop request requires the component;
   while the component is in the non-snoopable low power mode, responding to the received snoop request by sending a snoop request retry to the sender, wherein the snoop request retry informs the sender to retry the snoop request;
   bringing said component to a snoopable mode; and
   transitioning said component back to a non-snoopable low power mode after said snoop request has been at least partially satisfied, thereby allowing said component to enter into a low power mode between snoops.

2. The method of claim 1, wherein said component is part of a microprocessor-based data processing system and said component includes features for regulating power consumption in snoopable components associated with said microprocessor-based data processing system.

3. The method of claim 2, wherein said component has gating off memory coherency properties.

4. The method of claim 1, further comprising aborting said transition to low power mode if a snoop request arrives during said transition to low power mode.

5. The method of claim 1, further comprising providing a bus interface unit for receiving said initial snoop request and wherein said initial snoop request is received at said bus interface unit.

6. The method of claim 5, wherein said bus interface unit generates a wake pulse for transmission to a power state control initiating return of said component to snoopable mode in response to said wake pulse.

7. The method of claim 5, wherein said bus interface unit generates a snoop retry signal in reply to said snoop request signal.

8. The method of claim 7, further comprising recognizing a unique snoop ID associated with each snoop request.

9. The method of claim 8, further comprising storing said unique snoop ID.

10. The method of claim 9, wherein said component is not allowed to enter into said low power mode until there are no stored unique snoop IDs.

11. The method of claim 9, further comprising clearing each of said stored unique snoop ID after the retry snoop has been served.

12. The method of claim 9, further comprising clearing all said stored unique snoop IDs after one retry snoop has been served.

13. The method of claim 9, further comprising clearing said stored snoop IDs after a preset number of cycles have passed.

14. The method of claim 9, further comprising clearing said stored snoop IDs after said component has been taken out of the inactive mode by said data processing system.

15. The method of claim 1, further comprising waiting at least one (1) cycle before trying to enter a non-snoopable mode again.

16. The method of claim 1, further comprising waiting at least one hundred and twenty eight (128) cycles before trying to enter a non-snoopable mode again.

17. The method of claim 16, further comprising storing information in a status bit for each snoopable group and giving a valid response to snoop requests targeting a specific snoopable group without having to wake up said component.

18. The method of claim 1, wherein said allocated component has more than one group of snoopable contents.

* * * * *